United States Patent Office 2,772,202
Patented Nov. 27, 1956

2,772,202

METAPHOSPHATE COMPLEXES OF DIPHTHERIA AND TETANUS TOXOIDS AND PURIFYING SAID TOXOIDS

Morris B. Jacobs, Bayside, N. Y., assignor to American Home Products Corporation, New York, N. Y., a corporation of Delaware No Drawing. Application March 15, 1954,
Serial No. 416,405

10 Claims. (Cl. 167—78)

This application is a continuation-in-part of my previously filed application for a "Method for the Purification of Biological Substances," Serial No. 216,089, filed March 16, 1951.

This invention relates to a method for the simultaneous purification and concentration of materials such as toxoids, toxins, and the like and to the preparation of novel products therefrom.

Despite the many methods and variations of methods which have been proposed for the concentration and purification of toxoids, toxins, and the like, as has been reviewed by G. Norlin, Acta Path. Microbiol. Scand. 24, 505 (1947) and by M. B. Jacobs, J. Am. Pharm. Assoc., Sci. Ed., 39, 466 (1950), none has achieved widespread acceptance and crude bacterial toxin filtrates, and crude detoxified bacterial filtrates are still employed for immunization. There are two principal reasons for the use of such crude preparations. First the methods of purification are time-consuming and the losses in recovery are large. Secondly the equipment, comprising refrigerated boxes, chambers, or rooms, and refrigerated centrifuges necessary for certain methods is relatively so expensive as to preclude their general use.

It is an object of this invention to purify toxoids, toxins, and the like, by separating them from crude filtrates such as crude bacterial filtrates, crude detoxified bacterial filtrates, and the like.

It is a further object of this invention to concentrate the toxoids, toxins, and the like simultaneously with purifying said toxoids, toxins, and the like and thus provide a concentrated purified product which can be used in the preparation of polyantigens, viz., mixtures of antigens such as combinations of tetanus toxoids, diphtheria toxoids, and pertussis vaccines, or for other similar preparations.

In general, my method of simultaneously purifying and concentrating biological substances of the class consisting of toxoids, toxins, and the like comprises adding at least one polymeric phosphate acid substance which can form a toxoid or toxin precipitate. For example, I may use such substances as metaphosphoric acid, or hexametaphosphoric acid, or tripolyphosphoric acid, or other toxoid or toxin precipitating polymeric phosphate acid forming a resultant toxoid or toxin polymeric phosphate precipitate, thereby precipitating the desired toxoids or toxins, and the like, and thereafter separating said precipitated toxoid or toxin polymeric phosphate complex by centrifugation, filtration, or other conventional method. Following the above procedure, I dissolve the said precipitated complex in a buffer solution of a volume materially reduced from that of the original solution, whereupon a purified concentrate is obtained which is useful as an antigenic material when properly diluted or from which the polymeric phosphate ion can be removed by conventional methods such as dialysis or an ion exchange procedure before being used as an antigenic material.

The polymeric phosphate used to precipitate the toxoid, toxin, or like substances can be used directly, as in the case of the addition of a solution of metaphosphoric acid, but I prefer to use a non-toxic soluble salt of such acids as for instance sodium hexametaphosphate or sodium tripolyphosphate or related phosphates or mixtures of such phosphates and generate the acid in situ by the addition of hydrochloric acid or sulfuric acid or other non-toxic acid. The terms metaphosphate and hexametaphosphate are commonly used and are herein intended to refer to soluble vitreous alkali-metal phosphates consisting of materials having an $M_2O/P_2O_5$ mole ratio lying between 1.0 and 1.66, where "M" signifies an alkali metal; true cyclic metaphosphates having a mole ratio of 1.0, tripolyphosphate having a mole ratio of 1.66 and higher straight chain polyphosphates lying between these limits. (See Von Wazer, Ind. & Eng. Chem. 41, 189 (1949); Von Wazer, J. A. C. S., 72, 647 (1950); and Partridge, Chem. & Eng. News, 27, 214 (1949).) The precipitation can be carried out at room temperature but it is preferable with toxoids prepared with natural media to carry out the precipitation at somewhat higher temperatures of the order of 38° C. to 43° C. Buffer solutions such as mixtures of potassium dihydrogen phosphate and disodium hydrogen phosphate or of sodium citrate and sodium hydroxide which can give a pH of about 8, or solutions of salts which have buffering action such as sodium citrate which can give solutions having a pH of about 8 are preferable for the solution of the precipitated toxoids, toxins, and like materials.

By way of illustration but not as a limitation of my invention, the following examples of my invention are detailed.

Example I

One hundred and sixty milliliters of diphtheria toxoid were placed in each of two centrifuge cups. This diphtheria toxoid contained 40 flocculation units per ml. and had 4.1 mg. of nitrogen per ml. (Flocculation units per ml. (Lf./ml.) are used as a measure of the potency of a toxoid or toxin.) To each cup was added 32 ml. of 10 percent sodium hexametaphosphate aqueous solution, whereupon the two mixtures were mixed. To each resulting mixture, 32 ml. of 1 normal hydrochloric acid was added and again the mixtures were stirred. The resulting compositions were allowed to stand at room temperature until the precipitates which formed had flocculated. The cups were then placed in a centrifuge and were whirled at 2775 revolutions per minute for 5 minutes to pack the precipitates. The supernatant liquids were poured off, the cups were inverted and allowed to drain free from any remaining supernatant liquid and the precipitates which were packed at the bottom of the cups were dissolved in 10 ml. of a sodium citrate-sodium hydroxide buffer solution of pH 8.0. Then this solution was tested for flocculation units, it contained 1044 units per ml., a concentration 26 times that of the crude material. The nitrogen content of the concentrate was 2.29 mg. per ml. On the basis of the original nitrogen content of 10 flocculation units per mg. of nitrogen, the concentrate contained 456 flocculation units per mg. of nitrogen, signifying that a purification of 45.6 times was achieved.

Example II

One hundred and sixty ml. of diphtheria toxoid were placed in each of two centrifuge cups. This diphtheria toxoid contained 40 Lf./ml. and had 4.1 mg. of nitrogen per ml. The method as detailed in Example I was followed except that to each cup 40 ml. of 1 normal hydrochloric acid was added instead of 32 ml. The precipitates were dissolved in 10 ml. of sodium citrate-sodium hydroxide buffer solution of pH 8 and gave a product which contained 1280 Lf./ml. The nitrogen content was 2.60 mg./ml. This represented a concentration of 32 times that of the crude material and a purification of 49 times that of the original material.

*Example III*

One hundred and sixty ml. of diphtheria toxoid was placed into a centrifuge cup. This diphtheria toxoid contained 40 Lf./ml. and had 4.1 mg. of nitrogen per ml. To this was added 32 ml. of 10 percent aqueous sodium hexametaphosphate solution and the solution was mixed. To the mixture 36 ml. of normal sulfuric acid was added and the solution was again mixed. It was allowed to stand 30 minutes at 43° C. and then the centrifuge cup was placed in a centrifuge and whirled at 2775 revolutions per minute for 5 minutes to pack the precipitate which had formed. The supernatant liquid was poured off, the cup was inverted to permit any remaining supernatant liquid to drain off, and then the precipitate which was packed at the bottom of the cup was dissolved in 5 ml. of 3 percent sodium citrate solution having a pH of 7.77. This product had 1376 Lf./ml. and 2.51 mg. of nitrogen per ml. representing a concentration of 32 times and a purification of 54.8 times that of the original crude material.

*Example IV*

Six hundred ml. of tetanus toxoid was placed in a flask. To this 120 ml. of 10 percent sodium hexametaphosphate was added and after mixing 120 ml. of normal sulfuric acid was added. A precipitate formed almost immediately. This was gently suspended and the contents of the flask was transferred to centrifuge cups for centrifugation. The centrifuge cups were removed from the centrifuge, the supernatant liquids were poured off, the cups were inverted to permit them to drain thoroughly and the precipitates packed at the bottom of the cups were dissolved in a potassium dihydrogen phosphate-disodium hydrogen phosphate buffer of pH 8 by using 5 ml. of buffer solution four times, passing each 5 ml. of buffer solution from cup to cup successively. A total of 20 ml. of buffer solution was used and the precipitates dissolved readily in this solution. This represented a volume concentration of 30 times.

*Example V*

One hundred ml. of tetanus toxoid was placed in a centrifuge cup and to this 10 ml. of a freshly prepared 25 percent solution of metaphosphoric acid was added. A precipitate formed in about 10 minutes. This precipitate was collected by centrifugation and after pouring off the supernatant solution, allowing the supernatant solution to drain off, the desired precipitated toxoid was dissolved in 5 ml. of the phosphate pH 8 buffer solution mentioned in Example IV. This represented a volume concentration of 20 times that of the original crude tetanus toxoid.

*Example VI*

A small amount of the solid toxoid metaphosphate precipitate as prepared in Example IV was washed free of all metaphosphate and reconstituted in physiologic saline solution (using dilute NaOH and HCl for pH adjustment). This solution gave no qualitative test for phosphorous (color test with ammonium molybdate reagent and benzidine as described by Feigl in "Spot Tests," 3rd ed., Elsevier Publishing Co., Inc., New York (1946); sensitivity one part per million). After heating, preferably with acid, a positive phosphorus test was obtained.

After seven days storage of the metaphosphate toxoid solution in the cold, these test results were identical.

It is to be noted that the addition of the 1 normal sulfuric acid or the 1 normal hydrochloric acid or the 1 normal acetic acid was insufficient to precipitate the desired toxoid, toxin, or enzyme, or like material even on standing for long periods.

The advantages of my novel method are many. By a method which can be performed with equipment generally available in all chemical, pharmaceutical, immunochemical, and bacteriological laboratories, a manyfold concentration and purification of toxoids, toxins, and the like can be readily obtained. The products so obtained can be utilized in their concentrated form, as for instance in the preparation of polyantigens, or they can be diluted to make fluid toxin or toxoid preparations free from the impurities present in the parent crude bacterial filtrates, or they can be converted into alum-precipitated toxoids.

The scope of this invention is not to be limited to the examples herein disclosed since these are but the embodiments of my invention which is of a broad concept.

I claim:

1. In a method of concentrating and purifying a toxoid selected from the group consisting of tetanus and diphtheria toxoids from a dilute acqueous solution thereof, the steps comprising adding to said solution a soluble vitreous alkali-metal phosphate having an $M_2O/P_2O_5$ mole ratio lying between 1.0 and 1.66, where M signifies an alkali metal, lowering the pH of the solution to precipitate the toxoid complex, separating the precipitate from the solution and dissolving said precipitate in an alkaline solution having a pH of from about 7.7 to 8.0.

2. In a method of concentrating and purifying tetanus toxoid from dilute aqueous solutions thereof, the steps comprising adding to said solution a soluble vitreous alkali-metal phosphate having an $M_2O/P_2O_5$ mole ratio lying between 1.0 and 1.66, where M signifies an alkali metal, lowering the pH of the solution to precipitate the toxoid complex, separating the precipitate from the solution and dissolving said precipitate in an alkaline solution having a pH of from about 7.7 to 8.0.

3. In a method of concentrating and purifying diphtheria toxoid from dilute aqueous solutions thereof, the steps comprising adding to said solution a soluble vitreous alkali-metal phosphate having an $M_2O/P_2O_5$ mole ratio lying between 1.0 and 1.66, where M signifies an alkali metal, lowering the pH of the solution to precipitate the toxoid complex, separating the precipitate from the solution and dissolving said precipitate in an alkaline solution having a pH of from about 7.7 to 8.0.

4. In a method of concentrating and purifying tetanus toxoid from a dilute aqueous solution thereof, the steps comprising adding to said solution sodium hexametaphosphate, lowering the pH of the solution to precipitate the toxoid complex, separating the precipitate from the solution and dissolving said precipitate in an alkaline solution having a pH of from about 7.7 to 8.0.

5. In a method of concentrating and purifying diphtheria toxoid from a dilute aqueous solution thereof, the steps comprising adding to said solution sodium hexametaphosphate, lowering the pH of the solution to precipitate the toxoid complex, separating the precipitate from the solution and dissolving said precipitate in an alkaline solution having a pH of from about 7.7 to 8.0.

6. As a new composition of matter the complex of (1) a toxoid selected from the group consisting of tetanus and diphtheria toxoids with (2) the anion of a soluble vitreous alkali-metal phosphate having an $M_2O/P_2O_5$ mole ratio lying between 1.0 and 1.66, where M signifies an alkali metal, formed by the addition of said phosphate to an aqueous solution of said toxoid.

7. A new composition of matter according to claim 6, in which the toxoid is tetanus toxoid.

8. A new composition of matter according to claim 6, in which the toxoid is diphtheria toxoid.

9. As a new composition of matter the hexametaphosphate complex of tetanus toxoid.

10. As a new composition of matter the hexametaphosphate complex of diphtheria toxoid.

(References on following page)

References Cited in the file of this patent

UNITED STATES PATENTS 2,132,366    Wilson _____ Oct. 4, 1938

OTHER REFERENCES

Ser. No. 374,084, Reiss (A. P. C.), published May 11, 1943.

Eaton: on Purification and Concentration of Diphtheria Toxin, J. Bacteriology, vol. 31, pp. 347–365 (1936).

Eaton: on Purification and Concentration of Diphtheria Toxin, J. Bacteriology, vol. 34, pp. 139–151 (1937).

Hall et al.: Ind. & Eng. Chem. 1937, vol. 29, No. 14, pp. 421–424 and vol. 30, No. 1, pp. 23–26, 1938.

Norlin: on Purification of Diphtheria Toxin and Toxoid-Acta Path. Microbiol. Scand., vol. 24, pp. 505–524 (1947).

Wiame: Biochemica & Biophysica Acta, vol. I, 1947.

Lloyd: "Progress in Leather Science, 1920–1945" pub. Brit. Lea. Mfg. Res. Assoc., London, England, pp. 102–103, 1948.

Jacobs: on Concentration of Tetanus Toxoid, Jour. Am. Pharm. Assoc., Sci. Ed., vol. 39, pp. 466–471, August 1950.

Mudd: Annual Review of Microbiology, vol. 8, 1954.